United States Patent
Harms et al.

(10) Patent No.: US 10,414,498 B2
(45) Date of Patent: Sep. 17, 2019

(54) AGENT-BASED CARGO HANDLING SYSTEM

(71) Applicant: GOODRICH CORPORATION, Charlotte, NC (US)

(72) Inventors: Scott Harms, Ypsilanti, ND (US); Aaron J. Roberts, Jamestown, ND (US); Daniel Tweten, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 95 days.

(21) Appl. No.: 15/867,172

(22) Filed: Jan. 10, 2018

(65) Prior Publication Data

US 2019/0210727 A1  Jul. 11, 2019

(51) Int. Cl.
| | | |
|---|---|---|
| *G06F 7/00* | (2006.01) | |
| *B64D 9/00* | (2006.01) | |
| *G05D 3/20* | (2006.01) | |
| *H04L 29/08* | (2006.01) | |

(52) U.S. Cl.
CPC .............. *B64D 9/00* (2013.01); *G05D 3/20* (2013.01); *H04L 67/12* (2013.01); *B64D 2009/006* (2013.01)

(58) Field of Classification Search
None
See application file for complete search history.

(56) References Cited

U.S. PATENT DOCUMENTS

| 6,420,846 B1* | 7/2002 | Wolfe | ............... B64D 9/00 |
| | | | 198/780 |
| 2006/0186271 A1* | 8/2006 | Jacobsen | ............. B60P 1/36 |
| | | | 244/137.1 |
| 2008/0078867 A1* | 4/2008 | Milender | ............ B65G 13/065 |
| | | | 244/118.1 |
| 2014/0003902 A1* | 1/2014 | Inui | ............. B65G 49/00 |
| | | | 414/749.1 |

FOREIGN PATENT DOCUMENTS

| EP | 0512672 | 11/1992 |
| EP | 3244545 | 11/2017 |
| WO | 2007022814 | 3/2007 |
| WO | 2012/017080 | 2/2012 |

OTHER PUBLICATIONS

European Patent Office, European Search Report dated Jun. 17, 2019 in Application No. 19151193.0.

* cited by examiner

*Primary Examiner* — Yolanda R Cumbess (57) ABSTRACT

A power drive unit (PDU) for moving cargo within an aircraft includes an actuator configured to move a unit load device (ULD) relative to the PDU. The PDU also includes a network access device configured to receive a second PDU state corresponding to a second PDU, and to transmit data. The PDU also includes a controller configured to determine a current state of the PDU based on sensor data corresponding to presence of the ULD above the PDU and the second PDU state, and to control the actuator based on the current state of the PDU.

20 Claims, 9 Drawing Sheets

AGENT-BASED CARGO HANDLING SYSTEM

FIELD

The present disclosure is directed to a cargo loading systems that include multiple power drive units (PDUs) that each control their own actions based on a high-level goal received via a human machine interface (HMI).

BACKGROUND

A large variety of motorized systems for moving cargo are known. Motor driven rollers are typically employed in these systems. Aircraft often employ a series of motor driven power drive units ("PDUs") to quickly and efficiently propel cargo containers and pallets, otherwise known as unit load devices ("ULDs"), within the aircraft cargo compartment. This configuration can allow for the transportation of cargo from an external loader to an interior of the aircraft by one or more operators controlling the PDUs.

Conventional systems utilize an input device, such as a joystick, that an operator can manipulate to control the movement of individual ULDs throughout a cargo bay of the aircraft. The operator controls the entire movement of the ULD throughout the cargo bay, which results in cargo loading being a relatively time consuming task. This is because the operator must continuously manipulate a fixed input device during the entire loading process, tending to result in inefficiencies.

SUMMARY

Described herein is a power drive unit (PDU) for moving cargo within an aircraft. The PDU includes an actuator configured to move a unit load device (ULD) relative to the PDU. The PDU also includes a network access device configured to receive a second PDU state corresponding to a second PDU, and to transmit data. The PDU also includes a controller configured to determine a current state of the PDU based on sensor data corresponding to presence of the ULD above the PDU and the second PDU state, and to control the actuator based on the current state of the PDU.

In any of the foregoing embodiments, the controller is further configured to transmit the current state of the PDU to the second PDU via the network access device.

In any of the foregoing embodiments, the controller is configured to determine that the current state of the PDU is a covered state in response to the ULD being detected above the PDU, and to determine that the current state of the PDU is an uncovered state in response to a lack of detection of the ULD above the PDU.

In any of the foregoing embodiments, the covered state includes at least one of a covered idle state in which the actuator is idle, a driving state in which the actuator is moving the ULD relative to the PDU, or a parked state in which the actuator is fixed in a fixed position; and the uncovered state includes at least one of a leading state indicating that the ULD is progressing towards the PDU, a lagging state indicating that the ULD is progressing away from the PDU, or an uncovered idle state in which the ULD is located farther from the PDU than an adjacent PDU.

Any of the foregoing embodiments may further include a sensor configured to detect the sensor data, wherein the controller is further configured to identify that a current state of the PDU is at least one of covered indicating that a ULD is detected above the PDU, uncovered indicating a lack of the ULD being detected above the PDU, false covered indicating that the sensor falsely detects the ULD above the PDU, or false uncovered indicating that the sensor falsely detects a lack of the ULD above the PDU.

In any of the foregoing embodiments, the controller is further configured to determine the current state of the PDU based on whether the PDU is covered, uncovered, false covered, or false uncovered.

In any of the foregoing embodiments, the controller is further configured to receive a goal via the network access device corresponding to a desired location or a desired direction of the ULD within a cargo deck of the aircraft, and the controller is further configured to determine the current state of the PDU based on the goal.

Also disclosed is a system for moving cargo within a cargo deck of an aircraft. The system includes a plurality of power drive units (PDUs) each having an actuator configured to move the ULD relative to a corresponding PDU. Each of the PDUs further includes a network access device configured to receive a second PDU state corresponding to a second PDU, and to transmit data. Each of the PDUs further includes a controller configured to determine a current state of the corresponding PDU based on sensor data corresponding to presence of the ULD above the corresponding PDU and the second PDU state, and to control the actuator based on the current state of the PDU and a goal corresponding to a desired location or a desired direction of a unit load device (ULD) within the cargo deck.

In any of the foregoing embodiments, the controller is further configured to transmit the current state of the PDU to at least the second PDU via the network access device.

In any of the foregoing embodiments, the controller is configured to determine that the current state of the corresponding PDU is a covered state in response to the ULD being detected above the corresponding PDU, and to determine that the current state of the corresponding PDU is an uncovered state in response to a lack of detection of the ULD above the corresponding PDU.

In any of the foregoing embodiments, the covered state includes at least one of a covered idle state in which the actuator is idle, a driving state in which the actuator is moving the ULD relative to the corresponding PDU, or a parked state in which the actuator is fixed in a fixed position; and the uncovered state includes at least one of a leading state indicating that the ULD is progressing towards the corresponding PDU, a lagging state indicating that the ULD is progressing away from the corresponding PDU, or an uncovered idle state in which the ULD is located farther from the corresponding PDU than an adjacent PDU.

Any of the foregoing embodiments may also include a sensor configured to detect the sensor data, wherein the controller is further configured to identify that the corresponding PDU is at least one of covered indicating that a ULD is detected above the corresponding PDU, uncovered indicating a lack of the ULD being detected above the corresponding PDU, false covered indicating that the sensor falsely detects the ULD above the corresponding PDU, or false uncovered indicating that the sensor falsely detects a lack of the ULD above the corresponding PDU; and determine the current state of the PDU based on whether the PDU is covered, uncovered, false covered, or false uncovered.

Any of the foregoing embodiments may also include a human machine interface (HMI) configured to receive the goal from a user and to transmit the goal to at least some of the PDUs.

Any of the foregoing embodiments may also include a first bus coupled to a first plurality of PDUs of the plurality of PDUs and a second bus coupled to each of a second plurality of PDUs of the plurality of PDUs, and wherein the HMI is coupled to each of the first bus and the second bus and configured to transmit the goal to at least one of the first plurality of PDUs via the first bus or the second plurality of PDUs via the second bus.

Any of the foregoing embodiments may also include an aircraft power and communication interface device configured to provide electrical power to at least some of the plurality of PDUs and to at least one of transmit or receive PDU data from each of the plurality of PDUs.

Also disclosed is a method for moving cargo within a cargo deck of an aircraft. The method includes detecting, by a sensor, presence of a unit load device (ULD) above a power drive unit (PDU). The method further includes receiving, via a network access device of the PDU, a second PDU state corresponding to a second PDU. The method further includes determining, by a controller of the PDU, a current state of the PDU based on the presence of the ULD and based on the second PDU state. The method further includes controlling, by the controller, an actuator of the PDU based on the current state of the PDU.

Any of the foregoing embodiments may also include transmitting, via the network access device, the current state of the PDU to the second PDU.

Any of the foregoing embodiments may also include determining, by the controller, that the current state of the PDU is a covered state in response to the ULD being detected above the PDU, and determining, by the controller, that the current state of the PDU is an uncovered state in response to a lack of detection of the ULD above the PDU.

Any of the foregoing embodiments may also include identifying, by the controller, that the PDU is at least one of covered indicating that a ULD is detected above the PDU, uncovered indicating a lack of the ULD being detected above the PDU, false covered indicating that the sensor falsely detects the ULD above the PDU, or false uncovered indicating that the sensor falsely detects a lack of the ULD above the PDU; and determining, by the PDU, the current state of the PDU based on whether the PDU is covered, uncovered, false covered, or false uncovered.

Any of the foregoing embodiments may also include receiving, via the network access device, a goal corresponding to a desired location or a desired direction of the ULD within the cargo deck; and determining, by the controller, the current state of the PDU based on the goal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
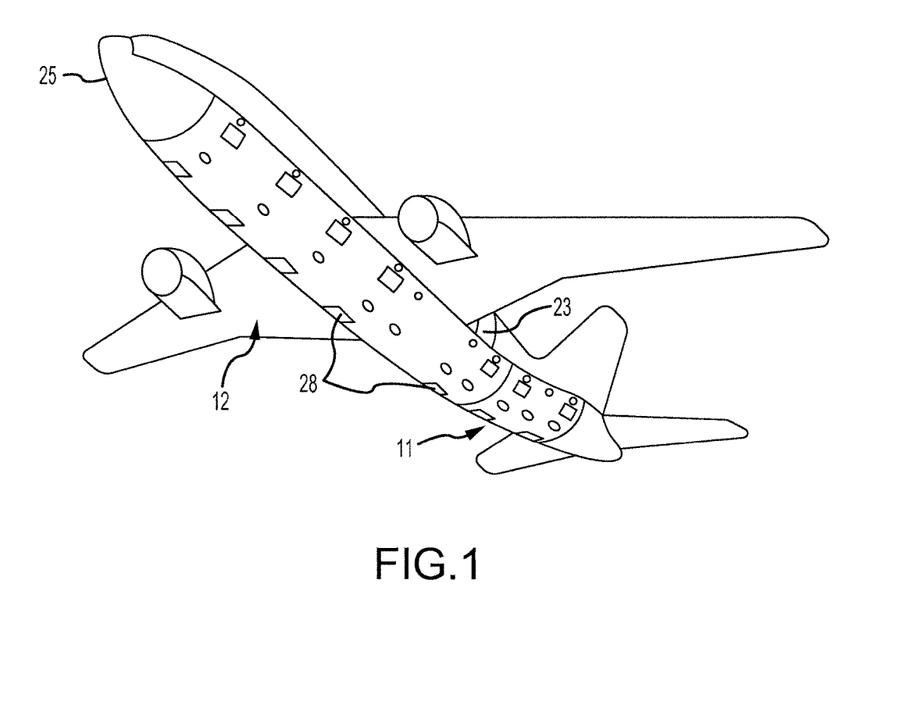
FIG. 1 illustrates an underside of an aircraft, in accordance with various embodiments.
Figure 2:
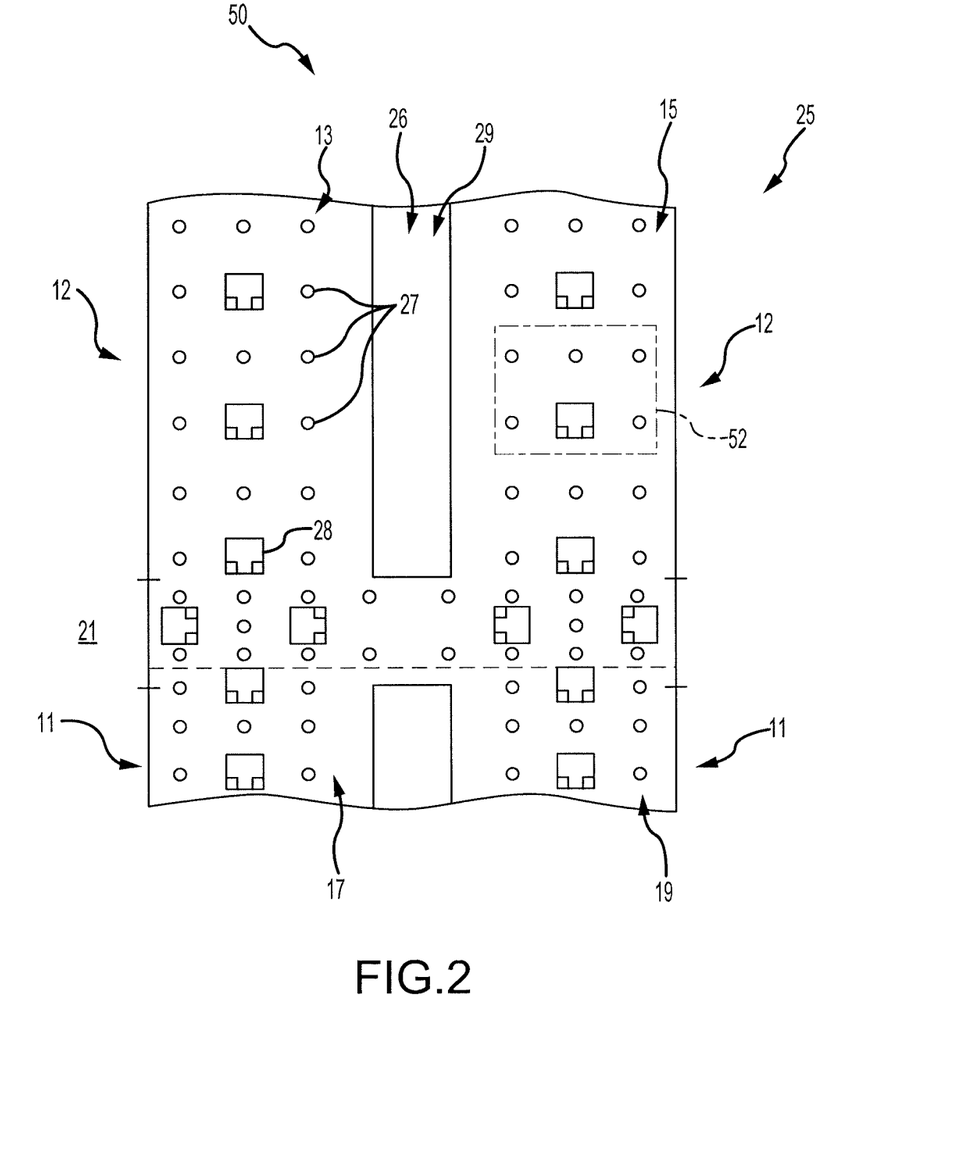
FIG. 2 illustrates an aircraft cargo deck of the aircraft of FIG. 1, in accordance with various embodiments.

Referring to FIGS. 1 and 2, an aircraft cargo deck 29 may be used to implement various embodiments of the present disclosure. A generally H-shaped conveyance surface 26 forms a deck of an aircraft, adjacent a cargo deck loading door 23. However, there are many other aircraft cargo deck configurations to which the embodiments of the disclosure can be implemented. For example, various aircraft, particularly those configured primarily for the transportation of cargo without passengers, may lack an upper passenger deck and may utilize an additional cargo deck installed in place of the upper passenger deck. Other aircraft may have two, three, or more parallel longitudinal tracks rather than the H-shape shown in FIG. 2.

The cargo compartment includes an agent-based cargo loading system, or system 50, comprising a plurality of freely rotating conveyance rollers 27 mounted in the cargo deck 29 to define the conveyance plane. Cargo loaded onto the aircraft cargo deck 29 may be moved manually throughout the cargo deck 29 upon the freely rotating conveyance rollers. However, it is desirable to electro-mechanically propel the cargo with minimal or no manual assistance, as some cargo may be relatively heavy and may pose a danger to operators who physically manipulate the cargo on the cargo deck 29. In that regard, the H-shaped cargo surface includes a number of PDUs 28 that provide a mechanism upon which cargo is propelled over the conveyance rollers 27. Each PDU 28 may include one or more actuator that may move cargo relative to the cargo deck 29.

In the longitudinal direction, the H-shaped conveyance surface 26 may include a left track and a right track along which cargo is to be stowed in parallel columns during flight. In the transverse direction, the cargo deck 29 may also be separated into a tail (or "aft") section 11 and a forward section 12. Thus, the left and right tracks may be divided into four sections, including two forward sections 13, 15 and two aft sections 17, 19. In addition to the four sections, there may be an additional path 21 between both tracks at the cargo deck loading door 23. This additional path 21 may divide the cargo deck 29 between the forward section 12 and aft section 11. This path is used to move cargo into and out the aircraft, and also to transfer cargo between the left and right storage tracks. In various embodiments, the cargo deck 29 may be divided into any quantity of sections, from a single section to any quantity that is physically possible. For example, the systems disclosed herein may operate in a cargo handling system having a single longitudinal lane.

In various embodiments, a human operator may provide a goal to the system 50 which may correspond to a desired location of a piece of cargo (referred to as a "unit load device" (ULD) 52) relative to the cargo deck 29. The PDUs 28 may each include logic that controls its respective operation based on the received goal, whether the PDU 28 is covered with a ULD 52, a current state of the PDU 28, and current states of other PDUs 28 in the system 50. For example, the received goal may he considered a high-level goal and, in that regard, may correspond to a desired location of the ULD relative to the cargo deck 29. For example, the ULD 52 may be positioned on a first PDU 28 and an operator may provide a desired location for the ULD 52. This type of system may significantly improve efficiency of loading cargo because the operator is not required to continuously control movement of the ULD 52 relative to the cargo deck 29.

Figure 3:
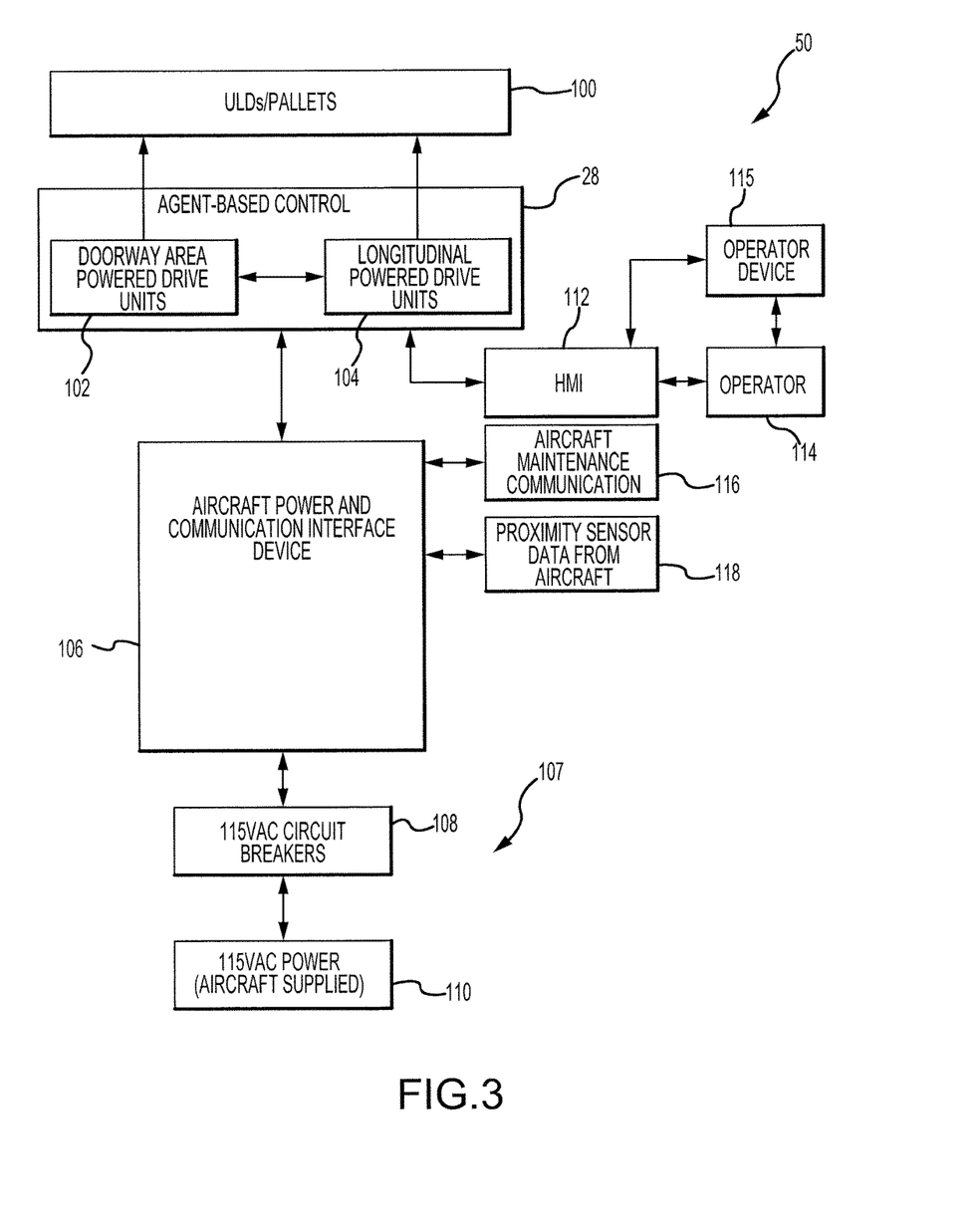
FIG. 3 illustrates a block diagram of an agent-based cargo loading system utilized on the aircraft cargo deck of FIG. 2, in accordance with various embodiments.

Turning now to FIGS. 2 and 3, a block diagram of the system 50 illustrates various features of the agent-based cargo loading system 50. Agent-based may refer to the fact that each of the PDUs 28 includes logic for self-control based on a received high-level goal.

The system 50 includes the PDUs 28, which may include doorway area PDUs 102 and longitudinal PDUs 104. The doorway area PDUs 102 may be placed relatively near the cargo deck loading door 23 and may transport ULDs 100 onto the cargo deck 29. In that regard, the doorway area PDUs 102 may transport cargo in a direction perpendicular to a longitudinal axis of the aircraft 25. The longitudinal PDUs 104 may transport the ULDs 100 forward and aft relative to the cargo deck 29. That is, the longitudinal PDUs 104 may transport the ULDs 100 in a direction parallel to the longitudinal axis of the aircraft 25.

The system 50 may further include an aircraft power and communication interface device, or power and communication device, 106. The system 50 may also include a power supply 107 which may, for example, include circuit breakers 108 and a power supply 110. For example, the circuit breakers 108 and the power supply 110 may be designed for 115 volts, but the power supply 107 may include any power supply. The system 50 may also include a human machine interface (HMI) 112, an aircraft maintenance communication port 116, and a data port 118 for receiving data, such as proximity sensor data, from the aircraft.

The power supply 110 may provide power for powering the PDUs 28. The power from the power supply 110 may travel through the circuit breakers 108, which may provide surge protection.

The power and communication device 106 may receive the power from the circuit breakers 108 and provide the power to each of the PDUs 28. The power and communication device 106 may further receive sensor data (and/or state data corresponding to current states of the PDUs 28) from the PDUs 28 and may transmit the sensor data (or state data) to the aircraft maintenance communication port 1116 and the data port 118. For example, the sensor data or state data may be analyzed by a device connected via the aircraft maintenance and communication port 116 to determine whether maintenance is suggested for any of the PDUs 28.

Although the power and communication device 106 may receive the sensor data from the PDUs 28, the sensor data from the PDUs 28 may also or instead be directly provided therebetween. Stated differently, sensor data from each PDU 28 may be available to each other PDU 28 without contacting the power and communication device 106.

The power and communication device 106 may further transmit data, such as proximity data from the aircraft, to the PDUs 28. In various embodiments, the PDUs 28 may control their actions based on the received data, such as proximity data. For example, the proximity data may be received from proximity sensors that detect a location or position of the ULDs 100 relative to the cargo deck 29. In various embodiments, the power and communication device 106 may transmit and/or receive data on a power bus or on a separate data bus. Where used in this context, bus refers to an electrical bus on which electrical signals may propagate between electronic components.

The HMI 112 may include any human machine interface such as an input device (including devices such as a keyboard, a microphone, a mouse, or the like). In various embodiments, the HMI 112 may be a wired or wireless communication port, which may be capable of communicating via a wired or wireless connection, such as using a controller area network (CAN) bus protocol, an Ethernet physical layer protocol (e.g., those using 10BASE-T, 100BASE-T, 1000BASE-T, etc), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, or any other protocol capable of transmitting data via a wired or wireless connection.

If the HMI 112 is a physical input device (such as a keyboard, microphone, or mouse) then the HMI 112 may receive control data from an operator 114. If the HMI 112 is a wired or wireless communication port then the HMI 112 may receive the control data from the operator 114 via an operator device 115. The operator device 115 may include any device capable of receiving user input and transmitting the user input to the HMI 112. The control data received via the HMI 112 may be or include a goal which, as mentioned above, may include a desired location of the ULDs relative to the cargo deck 29. In that regard, an operator may provide the goal from a location other than the aircraft, advantageously allowing the operator to control cargo loading on multiple aircraft at a single time.

In various embodiments, the HMI 112 may communicate directly with each of the PDUs 28 of the system 50. Such a decentralized system may be beneficial as it may eliminate a single failure point (e.g., if all communications from the HMI 112 go through a communication port, failure of the communication port may result in a lack of communication between the HMI 112 and the PDUs 28).

Figure 4:
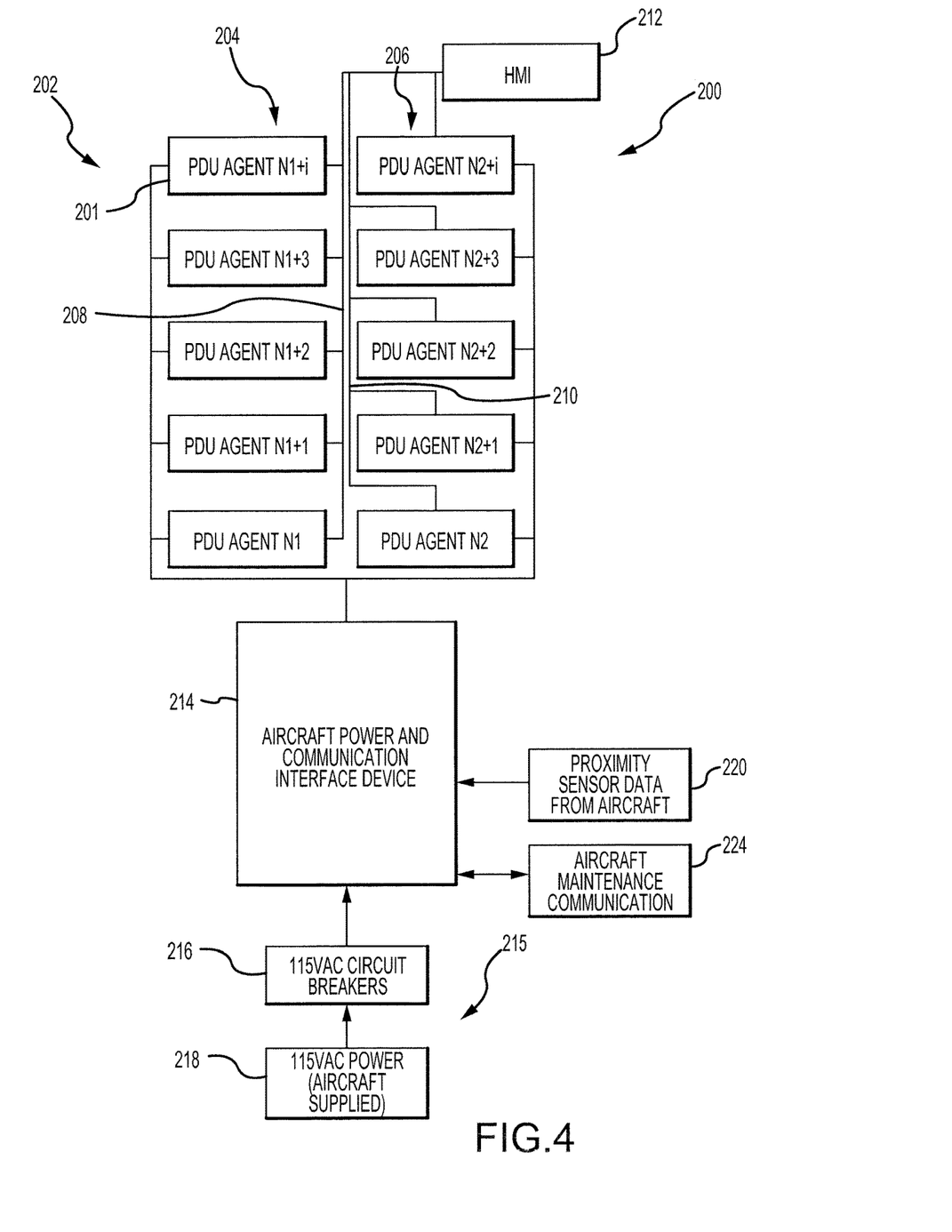
FIG. 4 illustrates a block diagram of an agent-based cargo loading system, in accordance with various embodiments.

Referring now to FIG. 4, another cargo loading system 200 is shown. The system 200, as with the system 50 of FIG. 3, may be an agent-based system. In that regard, the system 200 may include a plurality of PDUs 202 including a first plurality of PDUs 204 and a second plurality of PDUs 206. The first plurality of PDUs 202 may include a first PDU 201. The first PDU 201 may include similar features as each of the remaining plurality of PDUs 202, which will be discussed below beginning with reference to FIG. 5.

The system 200 may further include an aircraft power and communication interface device 214. The system 200 may also include an aircraft power supply 215 which may, for example, include circuit breakers 216 and a power supply 218. The system 200 may also include an aircraft maintenance communication port 224, and a data port 220 for receiving proximity sensor data from the aircraft. These elements may operate in a similar manner as the corresponding elements of the system 50 of FIG. 3.

The first plurality of PDUs 204 may each be coupled together via a first bus 208, and the second plurality of PDUs 206 may each be coupled together via a second bus 210. For example, the first bus 208 and the second bus 210 may include any communication bus, such as a CAN bus.

The system 200 may further include an HMI 212. The HMI 212 may operate in a similar manner as the HMI 112 of FIG. 3. In that regard, the HMI 212 may include a physical input device (which may receive a goal or other data from a user), or may include a wired or wireless communication port that may receive a goal or other data from a user device.

The HMI 212 may be coupled to the first bus 208 and the second bus 210. In that regard, the HMI 212 may provide the goal to each of the plurality of PDUs 202 by outputting the goal on the first bus 208 and on the second bus 210. In various embodiments, the HMI 212 may provide a first goal to the first plurality of PDUs 204 via the first bus 208, and may provide a second goal to the second plurality of PDUs 206 via the second bus 210. Based on the received goal, along with additional information, each of the PDUs 202 may control its own operation.

In various embodiments, the aircraft power and communication interface device 214 may provide power and/or data on the first bus 208 and the second bus 210, or via another one or more busses.

Figure 5:
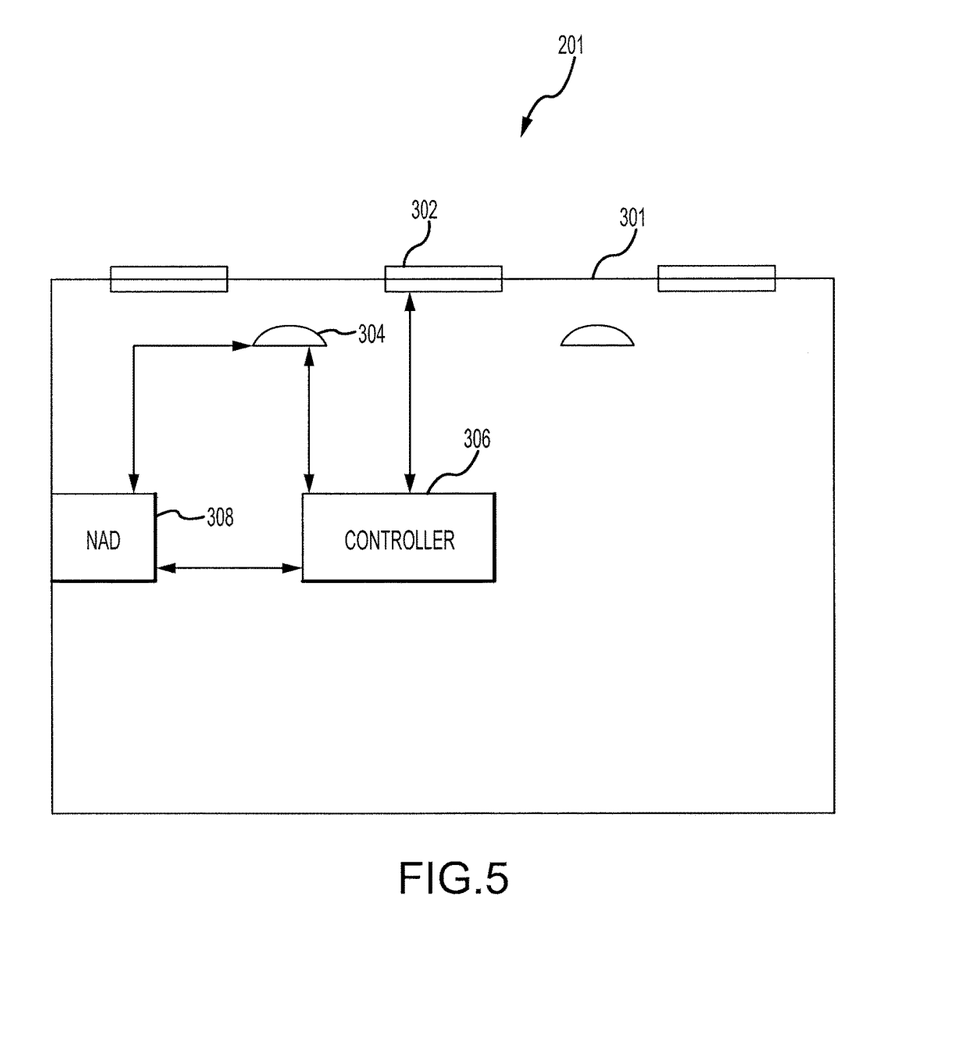
FIG. 5 illustrates a block diagram of a power drive unit (PDU) of the agent-based cargo loading system of FIG. 4, in accordance with various embodiments.

Turning now to FIG. 5, a block diagram of the first PDU 201 illustrates an example configuration of a PDU used in an agent-based cargo loading system. The PDU 201 may include one or more actuator 302, one or more sensor 304, a controller 306, and a network access device 308. In various embodiments, one or more of the one or more sensor 304 may be located on the PDU 201 or may be separate from the PDU 201.

The actuator 302 may be designed to move a ULD relative to the PDU 201. In that regard, the actuators 302 may include a powered rotary device (such as a powered wheel), a pulley system (such as a continuous track or Caterpillar track, such as those used to propel military vehicles and heavy equipment), or the like.

The sensor 304 may include any type of sensor capable of detecting the presence of a ULD above the PDU 201 (i.e., on or near the actuator 302, or proximate a top surface 301 of the PDU 201). For example, the sensor 304 may include a proximity sensor, a capacitive sensor, a capacitive displacement sensor, a Doppler effect sensor, an eddy-current sensor, an inductive sensor, a laser rangefinder sensor, a magnetic sensor, an active or passive optical sensor, an active or passive thermal sensor, a photocell sensor, a radar sensor, a sonar sensor, a lidar sensor, an ultrasonic sensor, or the like.

Figure 6:
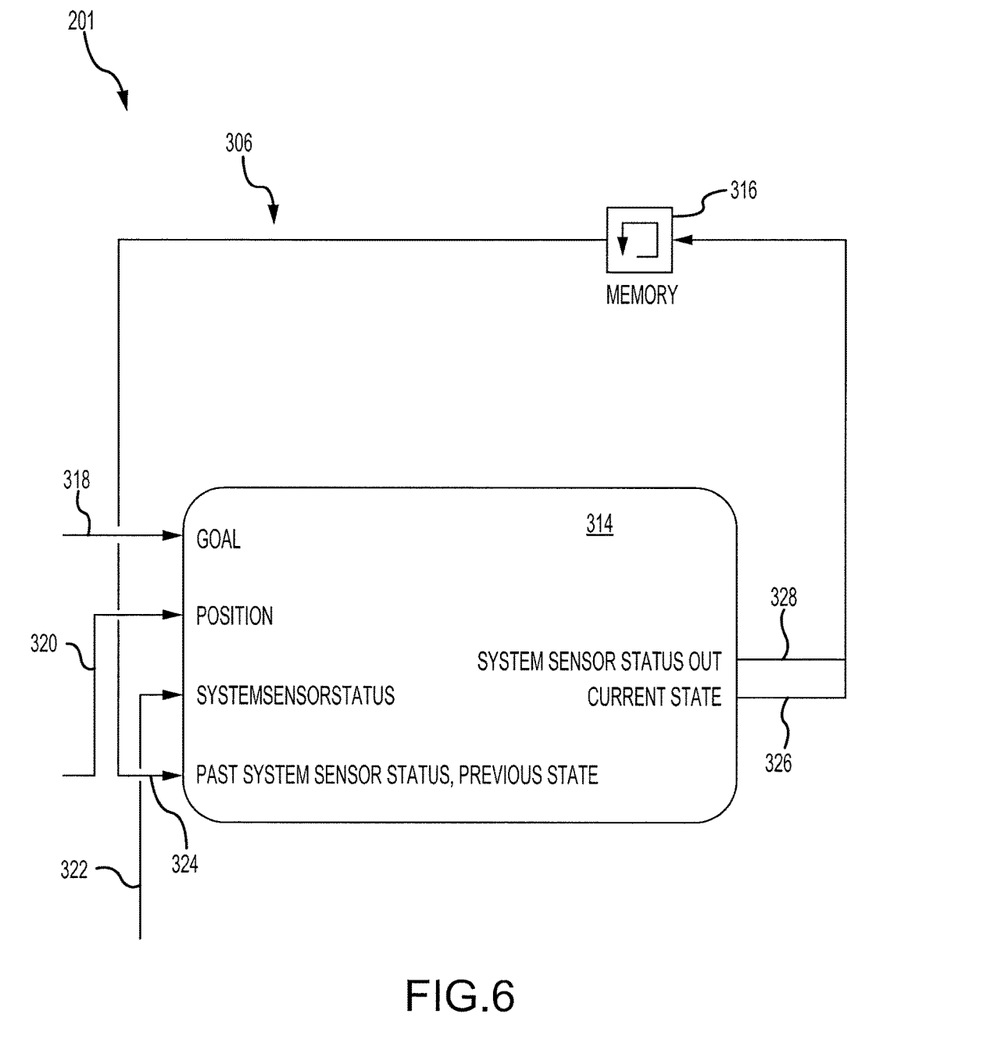
FIG. 6 illustrates a block diagram of a controller of the PDU of FIG. 5, in accordance with various embodiments.

Referring to FIGS. 5 and 6, the controller 306 may include hardware logic (such as a logic device 314) designed to determine a state of the PDU 201 and to control operation of the actuator 302 based on the state of the PDU 201. The controller 306 may include the logic device 314, which may include a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. The controller 306 may further include a non-transitory memory 316 designed to store instructions to be performed by the logic device 314 as well as to store any additional information requested by the logic device 314.

With brief reference to FIGS. 4 and 5, the network access device 308 may be designed to communicate with the HMI 212 and the remaining PDUs of the first plurality of PDUs 204 via the first bus 208. In that regard, the network access device 308 may communicate via any wired or wireless protocol such as a CAN bus protocol, an Ethernet physical layer protocol (e.g., those using 10BASE-T, 100BASE-T, 1000BASE-T, etc), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH protocol maintained by Bluetooth Special Interest Group), a wireless communications protocol defined at least in part by IEEE 802.15.4 (e.g., the ZigBee protocol maintained by the ZigBee alliance), a cellular protocol, an infrared protocol, an optical protocol, or any other protocol capable of transmitting information via a wired or wireless connection.

Turning now to FIG. 6, features of the controller 306 of the PDU 201 illustrate features of an example controller of an example PDU utilized in an agent-based cargo loading system. For example, the controller 306 of the PDU 201 may include a logic device 314 and a memory 316.

The logic device 314 may receive various inputs, such as a goal 318, a position 320, a system sensor status 322, and a past system sensor status and previous state 324. Based on these (and potentially other inputs), the logic device 314 may output a current state 326 of the PDU 201 and a system sensor status 328 that indicates a current status of the sensor.

The position may refer to the position of the PDU 201 relative to other PDUs in the system. For example, the position 320 may indicate that the PDU 201 is the third PDU from the cargo loading door, and is located on a left side (looking forward) of the aircraft.

Referring to FIGS. 5 and 6, the current state 326 may be used by the PDU 201 to drive the actuator 302, and the system sensor status 328 may be used to determine the current state 326. For example, the logic device 314 may determine the system sensor status 328 which includes a determination of whether the PDU 201 is covered (indicating that a ULDs is detected above the PDU 201), uncovered (indicating that no ULD is detected above the PDU 201), false covered (indicating that the sensor 304 falsely detects a ULD above the PDU 201 when in reality no ULDs is present above the PDU 201), or false uncovered (indicating that the sensor falsely detects a lack of ULD above the PDU 201 when in reality a ULDs is present above the PDU 201). In that regard, the logic device 314 may identify whether the sensor 304 is operating improperly (i.e., providing unreliable output). The memory 316 may store the system sensor status 328 and the current state 326, and may provide these as inputs to the logic device 314 during a subsequent time period as the past system sensor status and previous state 324.

Figure 7:
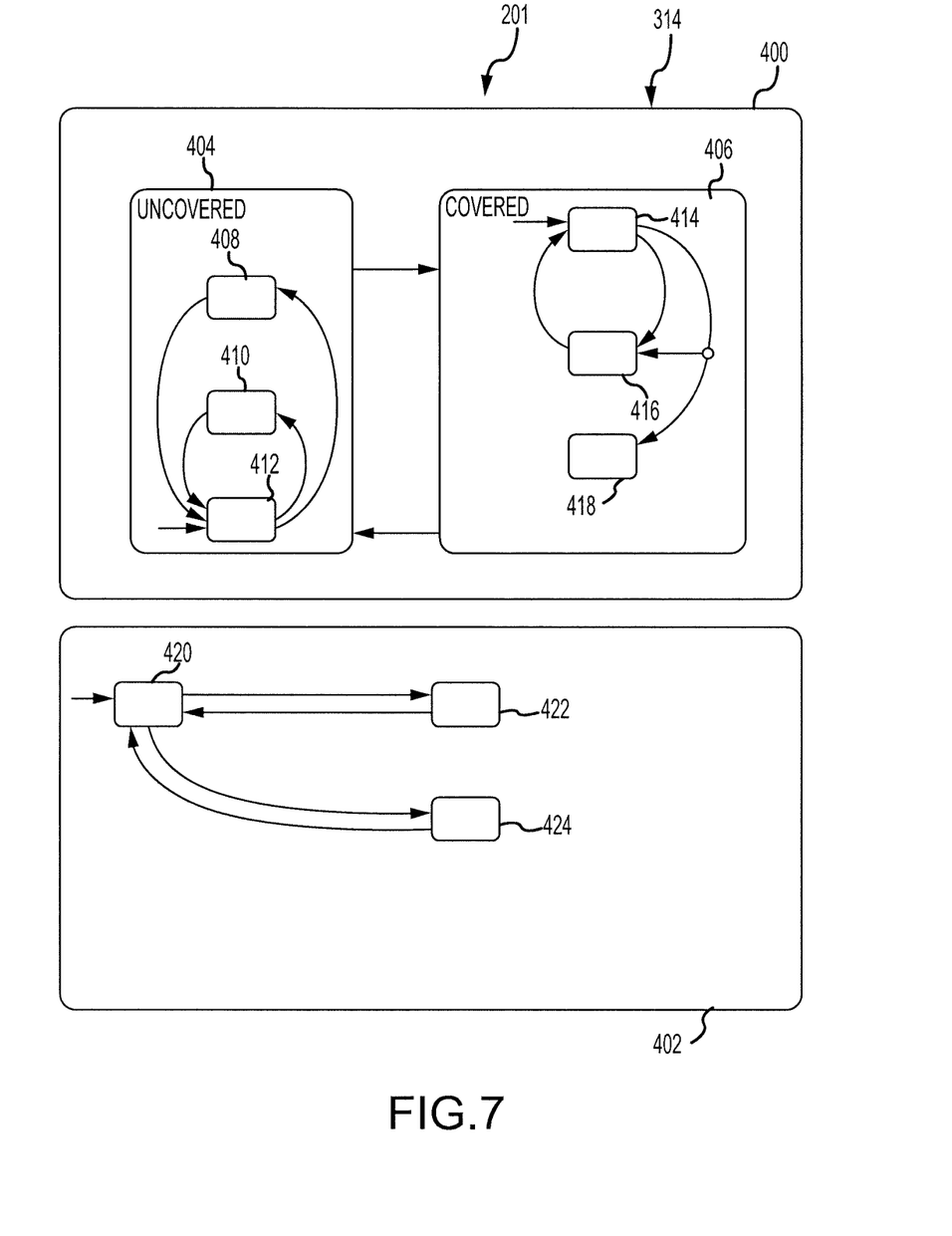
FIG. 7 illustrates a state logic and a false object detection logic of the controller of FIG. 6, in accordance with various embodiments.

Referring now to FIGS. 5 and 7, a state logic diagram 400 and false object detection logic 402 of the logic device 314 of the PDU 201 is shown. The state logic diagram 400 illustrates uncovered states 404 and covered states 406. The uncovered states 404 may include a leading state 408. The logic device 314 may determine that the current state is the leading state 408 in response to determining that a ULD is moving towards the PDU 201. For example, the logic device 314 may receive a current state from an adjacent PDU indicating that a ULD is moving towards the PDU 201. In various embodiments, the logic device 314 may control the actuator 302 to begin actuating in response to determining that the current state is the leading state 408.

The uncovered states 404 may further include a lagging state 410. The logic device 314 may determine that the current state is the lagging state 410 in response to determining that a ULD is no longer detected by the sensor 304 and is moving away from the PDU 201. In various embodiments, the logic device 314 may control the actuator 302 to continue actuating (such as for a predetermined amount of time) in response to determining that the current state is the lagging state 410.

The uncovered states may further include an uncovered idle state 412. The logic device 314 may determine that the current state is the uncovered idle state 412 in response to determining that no ULD is immediately approaching or moving away from the PDU 201. For example, the logic device 314 may determine that the current state is the uncovered idle state 412 in response to determining that the closest ULD is at least as far away as an adjacent PDU. The logic device 314 may control the actuator 302 to remain off (i.e., not actuate) in response to determining that the current state is the uncovered idle state 412.

The covered states 406 may include a covered idle state 414. The logic device 314 may determine that the current state is the covered idle state 414 in response to determining that a ULD is located above the PDU 201 and that the PDU 201 should not actuate the ULD. For example, the covered idle state 414 may be appropriate in response to a situation in which the ULD is to remain in position above the PDU 201 for a limited amount of time (such as in response to another ULD being stuck at an adjacent PDU, to satisfy the applied goal, or the like). The logic device 314 may control the actuator 302 to turn or remain off (i.e., not actuate) in response to determining that the current state is the covered idle state 414.

The covered states 406 may further include a driving state 416. The logic device 314 may determine that the current state is the driving state 416 in response to determining that a ULD is located above the PDU 201 and that the PDU 201 should actuate the ULD in a particular direction. The logic device 314 may control the actuator 302 to actuate the ULD in response to determining that the current state is the driving state 416.

The covered states 406 may further include a parked state 418. The logic device 314 may determine that the current state is the parked state 418 in response to determining that a ULD is located above the PDU 201 and should remain above the PDU 201 for at least a predetermined amount of time. For example, the logic device 314 may determine that the current state is the parked state in response to determining that a ULD above the PDU 201 is in its final location (i.e., based on the received goal). In various embodiments, the logic device 314 may control the actuator 302 to become in a locked position (such that it resists movement of the ULD) in response to determining that the current state is the parked state 418.

The false object detection logic 402 may be used to identify the system sensor status. The false object detection logic 402 may include a normal state 420 which indicates that the sensor 304 is operating properly. In that regard, the logic device 314 may indicate that the PDU 201 is in a covered state 406 in response to the sensor 304 detecting a ULD above the PDU 201, and may indicate that the PDU 201 is in an uncovered state 404 in response to the sensor 304 detecting no ULD above the PDU 201.

The false object detection logic 402 may further include a false uncovered state 422. The logic device 314 may determine that the state is the false uncovered state 422 in response to determining that the sensor 304 detect no ULD above the PDU 201 but that, in reality, a ULD is actually present above the PDU 201. For example, the logic device 314 may determine that the state is the false uncovered state 422 in response to the sensor detecting no ULD but a proximity sensor of a corresponding aircraft detecting a ULD above the PDU 201. In that regard, the logic device 314 may determine that the PDU 201 is in a covered state 406 in response to determining that the state is the false uncovered state 422.

The false object detection logic 402 may further include a false covered state 424. The logic device 314 may determine that the state is the false covered state 424 in response to determining that the sensor 304 detects a ULD above the PDU 201 but that no ULD is actually present above the PDU 201. For example, the logic device 314 may determine that the state is the false covered state 424 in response to the sensor detecting presence of a ULD but a proximity sensor of a corresponding aircraft detecting no ULD (i.e., a lack of a ULD) above the PDU 201. In that regard, the logic device 314 may determine that the PDU is in an uncovered state 404 in response to determining that the state is the false covered state 424.

Figure 8:
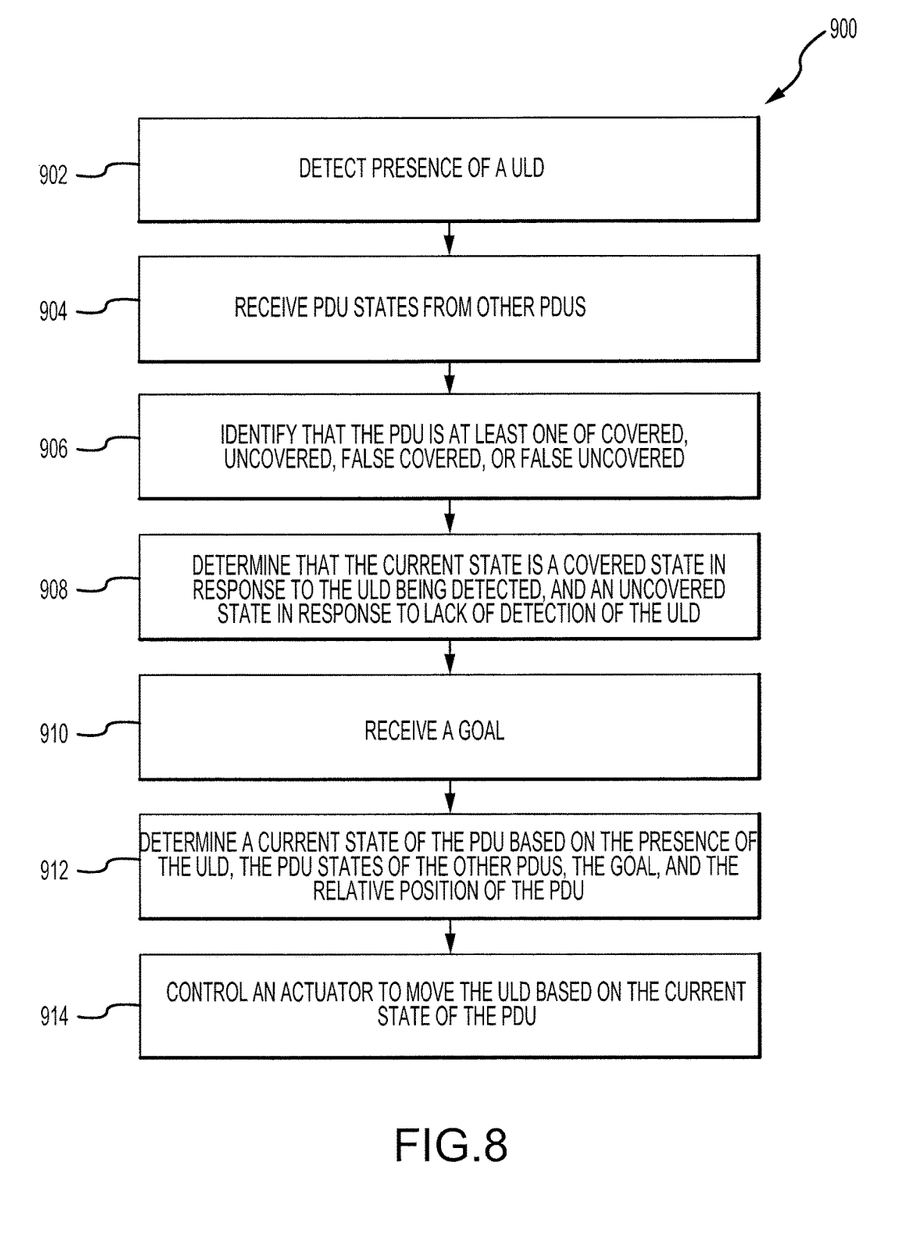
FIG. 8 illustrates a method for moving cargo within an aircraft using an agent-based cargo loading system, in accordance with various embodiments.

Referring now to FIG. 8, a method 900 for controlling movement of cargo by a PDU of an agent-based cargo loading system is shown. In block 902, a sensor of the PDU may detect the presence of a ULD above the PDU. In block 904, the PDU may receive a PDU state (via a network access device) from other PDUs, such as a second PDU state corresponding to a state of a second PDU. This information may be used by a logic device to determine a current state of the PDU. For example, if an adjacent PDU indicates that it is in a lagging state, then the logic device may identify that it is in a leading state in response to receiving the state of the adjacent PDU and in response to determining that no ULD is located above the PDU.

In block 906, the logic device of the PDU may identify whether the PDU is covered, uncovered, false covered, or false uncovered, as described above.

In block 908, the logic device of the PDU may determine that the current state is a covered state in response to the ULD being detected (or the PDU being false uncovered), and may determine that the current state is an uncovered state in response to lack of detection of the ULD (or the PDU being false covered).

In block 910, the logic device of the PDU may receive a goal (such as via the network access device). For example, the goal may correspond to a desired location of a ULD relative to the PDU.

In block 912, the logic device of the PDU may determine a current state of the PDU based on the presence of the ULD (i.e., whether the PDU is in a covered state or an uncovered state), the PDU states of the other PDUs, the received goal, and the relative position of the PDU (which may be stored in a memory).

In block 914, the logic device of the PDU may control an actuator to move the ULD based on the current state of the PDU.

Figure 9:
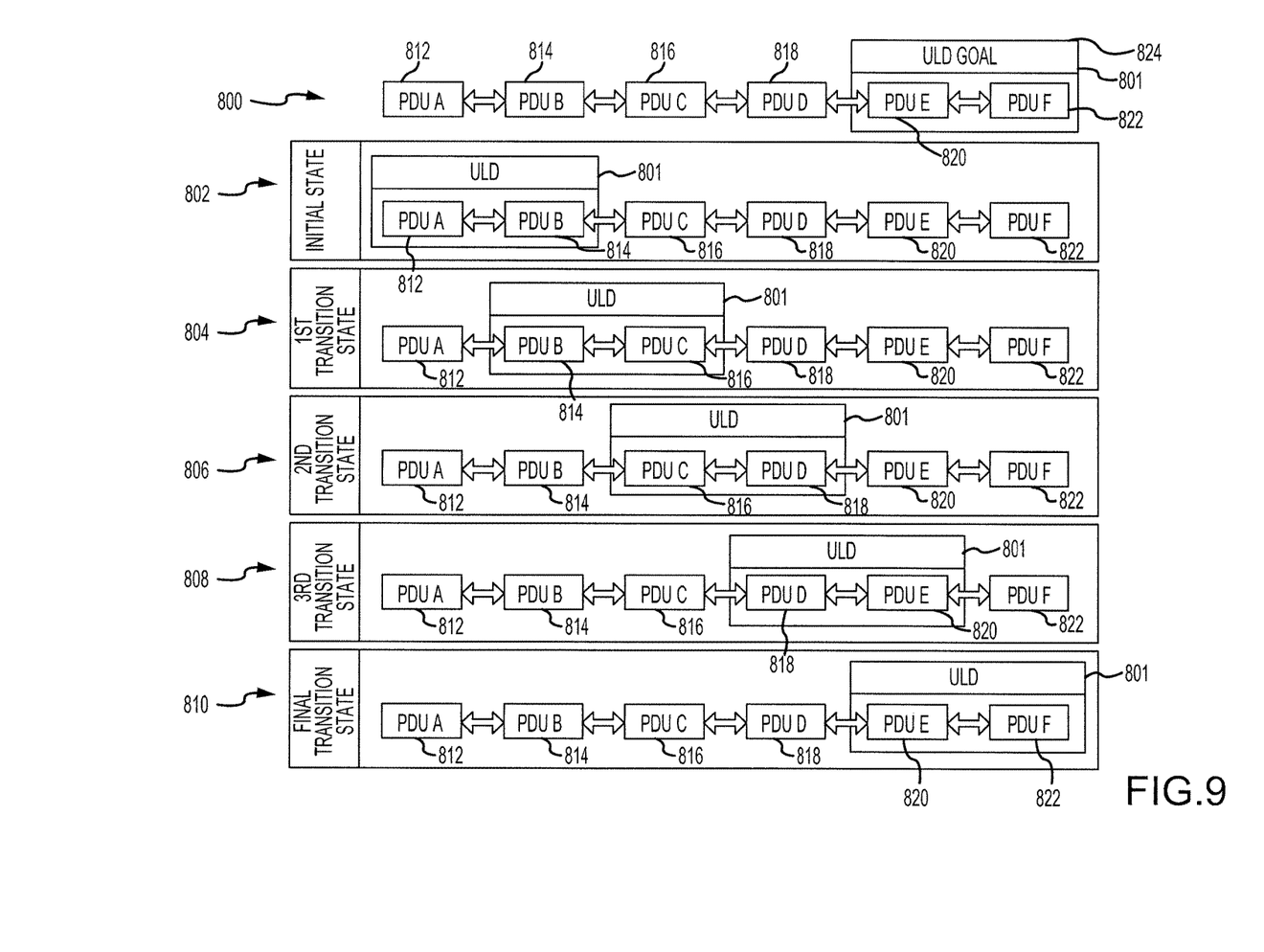
FIG. 9 illustrates an example of use of the method of FIG. 8, in accordance with various embodiments.

Turning to FIG. 9, an exemplary implementation of the method 900 of FIG. 8 is shown. A first row 800 illustrates a goal 824, which corresponds to a ULD 801 being located above a fifth PDU 820 and a sixth PDU 822.

In an initial state 802, the ULD 801 may be located above a first PDU 812 and a second PDU 814. In the initial state 802, a third PDU 816 may determine that it is in a leading state based on the received states from the first PDU 812 and the second PDU 814 (i.e., driving states). Furthermore, the first PDU 812 and the second PDU 814 may determine that they are in the driving states. The third PDU 816 may then begin to drive its actuators in response to determining that the ULD 801 is moving towards the third PDU 816.

In a first transition state 804, the ULD 801 may have moved away from the first PDU 812 (the first PDU 812 may then be in a lagging state) and be located above the second PDU 814 and the third PDU 816. In that regard, a fourth PDU 818 may determine that it is in a leading state and may begin to drive its actuator.

In a second transition state 806, the first PDU 812 may determine that it is in an uncovered idle state because no ULD is located nearby. The ULD 801 may be located above the third PDU 816 and the fourth PDU 818.

In a third transition state 808, the ULD 801 is located above the fourth PDU 818 and the fifth PDU 820. In a final state 810, the ULD 801 is located above the fifth PDU 820 and the sixth PDU 822, which corresponds to the goal 824. In that regard, the fifth PDU 820 and the sixth PDU 822 may determine that they are in parked states in this situation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power drive unit (PDU) for moving cargo within an aircraft, comprising:
   an actuator configured to move a unit load device (ULD) relative to the PDU;
   a network access device configured to receive a second PDU state corresponding to a second PDU, and to transmit data; and
   a controller configured to determine a current state of the PDU based on sensor data corresponding to presence of the ULD above the PDU and the second PDU state, and to control the actuator based on the current state of the PDU.

2. The PDU of claim 1, wherein the controller is further configured to transmit the current state of the PDU to the second PDU via the network access device.

3. The PDU of claim 1, wherein the controller is configured to determine that the current state of the PDU is a covered state in response to the ULD being detected above the PDU, and to determine that the current state of the PDU is an uncovered state in response to a lack of detection of the ULD above the PDU.

4. The PDU of claim 3, wherein:
   the covered state includes at least one of a covered idle state in which the actuator is idle, a driving state in which the actuator is moving the ULD relative to the PDU, or a parked state in which the actuator is fixed in a fixed position; and
   the uncovered state includes at least one of a leading state indicating that the ULD is progressing towards the PDU, a lagging state indicating that the ULD is progressing away from the PDU, or an uncovered idle state in which the ULD is located farther from the PDU than an adjacent PDU.

5. The PDU of claim 1, further comprising a sensor configured to detect the sensor data, wherein the controller is further configured to identify that a current state of the PDU is at least one of covered indicating that a ULD is detected above the PDU, uncovered indicating a lack of the ULD being detected above the PDU, false covered indicating that the sensor falsely detects the ULD above the PDU, or false uncovered indicating that the sensor falsely detects a lack of the ULD above the PDU.

6. The PDU of claim 5, wherein the controller is further configured to determine the current state of the PDU based on whether the PDU is covered, uncovered, false covered, or false uncovered.

7. The PDU of claim 1, wherein the controller is further configured to receive a goal via the network access device corresponding to a desired location or a desired direction of the ULD within a cargo deck of the aircraft, and the controller is further configured to determine the current state of the PDU based on the goal.

8. A system for moving cargo within a cargo deck of an aircraft, comprising:
a plurality of power drive units (PDUs) each comprising:
an actuator configured to move the ULD relative to a corresponding PDU;
a network access device configured to receive a second PDU state corresponding to a second PDU, and to transmit data; and
a controller configured to determine a current state of the corresponding PDU based on sensor data corresponding to presence of the ULD above the corresponding PDU and the second PDU state, and to control the actuator based on the current state of the PDU and a goal corresponding to a desired location or a desired direction of a unit load device (ULD) within the cargo deck.

9. The system of claim 8, wherein the controller is further configured to transmit the current state of the PDU to at least the second PDU via the network access device.

10. The system of claim 8, wherein the controller is configured to determine that the current state of the corresponding PDU is a covered state in response to the ULD being detected above the corresponding PDU, and to determine that the current state of the corresponding PDU is an uncovered state in response to a lack of detection of the ULD above the corresponding PDU.

11. The system of claim 10, wherein:
the covered state includes at least one of a covered idle state in which the actuator is idle, a driving state in which the actuator is moving the ULD relative to the corresponding PDU, or a parked state in which the actuator is fixed in a fixed position; and
the uncovered state includes at least one of a leading state indicating that the ULD is progressing towards the corresponding PDU, a lagging state indicating that the ULD is progressing away from the corresponding PDU, or an uncovered idle state in which the ULD is located farther from the corresponding PDU than an adjacent PDU.

12. The system of claim 8, further comprising a sensor configured to detect the sensor data, wherein the controller is further configured to:
identify that the corresponding PDU is at least one of covered indicating that a ULD is detected above the corresponding PDU, uncovered indicating a lack of the ULD being detected above the corresponding PDU, false covered indicating that the sensor falsely detects the ULD above the corresponding PDU, or false uncovered indicating that the sensor falsely detects a lack of the ULD above the corresponding PDU; and
determine the current state of the PDU based on whether the PDU is covered, uncovered, false covered, or false uncovered.

13. The system of claim 8, further comprising a human machine interface (HMI) configured to receive the goal from a user and to transmit the goal to at least some of the PDUs.

14. The system of claim 13, further comprising a first bus coupled to a first plurality of PDUs of the plurality of PDUs and a second bus coupled to each of a second plurality of PDUs of the plurality of PDUs, and wherein the HMI is coupled to each of the first bus and the second bus and configured to transmit the goal to at least one of the first plurality of PDUs via the first bus or the second plurality of PDUs via the second bus.

15. The system of claim 8, further comprising an aircraft power and communication interface device configured to provide electrical power to at least some of the plurality of PDUs and to at least one of transmit or receive PDU data from each of the plurality of PDUs.

16. A method for moving cargo within a cargo deck of an aircraft, comprising:
detecting, by a sensor, presence of a unit load device (ULD) above a power drive unit (PDU);
receiving, via a network access device of the PDU, a second PDU state corresponding to the a second PDU;
determining, by a controller of the PDU, a current state of the PDU based on the presence of the ULD and based on the second PDU state; and
controlling, by the controller, an actuator of the PDU based on the current state of the PDU.

17. The method of claim 16, further comprising transmitting, via the network access device, the current state of the PDU to the second PDU.

18. The method of claim 16, further comprising determining, by the controller, that the current state of the PDU is a covered state in response to the ULD being detected above the PDU, and determining, by the controller, that the current state of the PDU is an uncovered state in response to a lack of detection of the ULD above the PDU.

19. The method of claim 16, further comprising:
identifying, by the controller, that the PDU is at least one of covered indicating that a ULD is detected above the PDU, uncovered indicating a lack of the ULD being detected above the PDU, false covered indicating that the sensor falsely detects the ULD above the PDU, or false uncovered indicating that the sensor falsely detects a lack of the ULD above the PDU; and
determining, by the PDU, the current state of the PDU based on whether the PDU is covered, uncovered, false covered, or false uncovered.

20. The method of claim 16, further comprising:
receiving, via the network access device, a goal corresponding to a desired location or a desired direction of the ULD within the cargo deck; and
determining, by the controller, the current state of the PDU based on the goal.

* * * * *